(12) United States Patent
Peled et al.

(10) Patent No.: US 6,492,047 B1
(45) Date of Patent: Dec. 10, 2002

(54) FUEL CELL WITH PROTON CONDUCTING MEMBRANE

(75) Inventors: Emanuel Peled, Even Yehuda (IL); Tair Duvdevani, Ramat Gan (IL); Avi Melman, Holon (IL); Adi Aharon, Herzliya (IL)

(73) Assignee: Ramot University Authority for Applied Research & Industrial Development Ltd., Tel Aviv (IL)

(*) Notice: Subject to any disclaimer, the term of this patent is extended or adjusted under 35 U.S.C. 154(b) by 0 days.

(21) Appl. No.: 09/604,297

(22) Filed: Jun. 26, 2000

Related U.S. Application Data

(63) Continuation-in-part of application No. 09/484,267, filed on Jan. 18, 2000.

(51) Int. Cl.[7] .............................................. H01M 8/10
(52) U.S. Cl. ............................................ 429/30; 429/33
(58) Field of Search ........................... 429/30, 33, 41, 429/46

(56) References Cited

U.S. PATENT DOCUMENTS

| | | | |
|---|---|---|---|
| 3,143,440 A | 8/1964 | Hunger et al. | |
| 3,935,028 A | 1/1976 | Strasser et al. | 429/14 |
| 4,252,868 A | 2/1981 | Bohm et al. | 429/41 |
| 4,276,353 A | 6/1981 | Novinski et al. | 428/558 |
| 4,623,415 A | 11/1986 | Kahara et al. | 156/325 |
| 4,687,715 A * | 8/1987 | Michael | 429/41 |
| 4,780,954 A | 11/1988 | Kato | 29/623.5 |
| 5,178,971 A * | 1/1993 | Itoh et al. | 429/40 |
| 5,432,023 A | 7/1995 | Yamada et al. | 429/34 |
| 5,599,638 A | 2/1997 | Surampudi et al. | 429/33 |
| 5,709,786 A | 1/1998 | Friese et al. | 204/421 |
| 5,766,787 A | 6/1998 | Watanabe et al. | 429/33 |
| 5,773,162 A | 6/1998 | Surampudi et al. | 429/39 |
| 5,853,909 A | 12/1998 | Reiser | 429/13 |
| 5,861,222 A | 1/1999 | Fischer et al. | 429/42 |
| 5,919,583 A * | 7/1999 | Grot et al. | 429/33 |
| 5,926,361 A | 7/1999 | Alford | 361/502 |
| 5,952,119 A | 9/1999 | Wilson | 429/34 |
| 6,007,934 A | 12/1999 | Auer et al. | 429/44 |
| 6,059,943 A | 5/2000 | Murphy et al. | 204/296 |
| 6,117,581 A | 9/2000 | Shelef | 429/44 |
| 6,156,449 A * | 12/2000 | Zuber et al. | 429/42 |
| 6,238,534 B1 * | 5/2001 | Mao et al. | 204/416 |

FOREIGN PATENT DOCUMENTS

| | | |
|---|---|---|
| DE | 19913977 | 9/2000 |
| EP | 1087455 | 3/2001 |
| JP | 01192742 | 8/1989 |
| WO | WO 97/02615 | 1/1997 |
| WO | WO 97/21256 | 6/1997 |
| WO | WO 99/08785 | 2/1999 |
| WO | 99/44245 | 9/1999 |
| WO | WO 00/42671 | 7/2000 |

OTHER PUBLICATIONS

Peled E. et al., "A Novel Proton–Conducting Membrane in Electrochemical and Solid–State Letters", vol. 1, No. 5, Nov. 1, 1998, pp. 210–211.

* cited by examiner

*Primary Examiner*—Patrick Ryan
*Assistant Examiner*—M. Wills
(74) *Attorney, Agent, or Firm*—Nath & Associates PLLC; Gary M. Nath; Todd L. Juneau

(57) ABSTRACT

The present invention provides improved, low-cost fuel cells having reduced fuel crossover, reduced sensitivity to metal ion impurities and ability to operate under a broad range of temperatures. Additionally, new effective organic fuels are described for use in such fuel cells. The invention further provides improved methods for catalyst preparation and a new integrated flow field system for use in $H_2/O_2$ fuel cells.

11 Claims, 12 Drawing Sheets

FUEL CELL WITH PROTON CONDUCTING MEMBRANE

This application is a CIP of U.S. patent application Ser. No. 09/484,267, filed Jan. 18, 2000 the entire contents of which are incorporated in their entirety.

FIELD OF THE INVENTION

This invention relates to an electric cell that converts the chemical energy obtained in a fuel oxidation reaction directly into electric energy in a continuous process. More specifically the invention relates to fuel cells.

BACKGROUND OF THE INVENTION

Fuel cells are often described as continuously operating batteries or as electrochemical engines. Fuel cells utilize an external supply of fuel and oxygen (or air) and produce power continuously, as long as the fuel and oxygen supply is maintained.

The most classic fuel cell is the $H_2/O_2$ fuel cell of the direct or indirect type, wherein hydrogen is oxidized to form $H_3O^+$ at the anode and oxygen is reduced to water at the cathode. In the direct type, hydrogen and oxygen are used as such, the fuel being produced in independent installations. The indirect type employs a hydrogen-generating unit which can use as raw material a wide variety of fuels.

Another type of fuel cell is the organic fuel cell. In a direct oxidation cell an aqueous solution of an organic fuel such as methanol, formaldehyde or formic acid, is directly fed into the fuel cell without any previous chemical modification, where the fuel is oxidized at the anode, and oxygen is reduced to water at the cathode.

A major distinguishing characteristic of different fuel cells is in the electrolyte used. NASA's Jet Propulsion Laboratory (JPL) developed a direct liquid-feed cell using a solid membrane electrolyte. A detailed description of JPL's fuel cells can be found, for example, in U.S. Pat. Nos. 5,599,638 and 5,773,162. These fuel cells operate without any acid electrolyte and comprise solid electrolyte membranes fabricated from proton-exchange materials, especially Nafion™ (manufactured by DuPont). When methanol is used as the fuel, the electro-oxidation of methanol at the anode can be represented by:

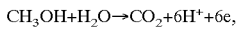

$$CH_3OH+H_2O \rightarrow CO_2+6H^++6e,$$

and the electro-reduction of oxygen at the cathode can be represented by:

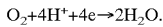

$$O_2+4H^++4e \rightarrow 2H_2O.$$

Protons generated at the anode are transported directly across the electrolyte membrane to the cathode. A flow of current is sustained by a flow of ions through the cell and electrons through the external load.

JPL's fuel cells and other related fuel cells known in the art, which use Nafion as solid electrolyte membrane, suffer from several drawbacks resulting from such membrane, among them high cost, high permeability of the membrane to the fuel (high fuel crossover), sensitivity to heavy metals impurities, lack of operation at temperatures below 0° C. or over 100° C. and high sensitivity to water management in the membrane.

SUMMARY OF THE INVENTION

The challenge in fuel cell development for practical applications is to improve the economics through the use of low-cost components with acceptable life and performance. In view of the above-mentioned problems associated with solid electrolyte membranes such as Nafion and related materials, it is an object of the present invention to provide a novel, low cost fuel cell having a reduced fuel crossover, reduced sensitivity to metal ion impurities and ability to operate at temperatures even higher than 100° C. or lower than 0° C. It is a further object of the invention to provide new effective organic fuels which undergo clean and efficient oxidation in the fuel cell. It is yet a further object of the invention to provide improved methods for catalyst preparation. Still, it is an object of the present invention to provide a new integrated flow field system for circulating gas and electrolyte in a $H_2/O_2$ fuel cell.

Other objects of the invention will become apparent as the description of the invention proceeds.

Thus, the present invention provides by the first of its aspects a fuel cell comprising a housing, a solid electrolyte membrane having a first and a second surface, disposed in said housing to partition it into an anode side and a cathode side, an anode and a cathode each comprising a catalyst layer and a carbon backing layer and being formed on said first and second membrane surfaces respectively, so as to connect said first surface to the anode side and said second surface to the cathode side, said anode side comprising means for storing an oxidizable fuel or for circulating it past the anode and said cathode side comprising means for flowing oxygen or air past the cathode, wherein said solid electrolyte membrane is a proton conducting membrane having pores with a diameter size which is essentially smaller than 30 nm and comprising:

(i) 5% to 60% by volume of an electrically nonconductive inorganic powder having a good acid absorption capacity, said powder comprising essentially nanosize particles;

(ii) 5% to 50% by volume of a polymeric binder that is chemically compatible with acid, oxygen and said fuel; and (iii) 10 to 90% by volume of an acid or aqueous acid solution.

The solid proton conducting membrane used in the fuel cells of the present invention has been described in WO 99/44245. The polymeric binders used in these membranes are selected from the group consisting of poly(vinilydenfluoride), poly(vinilydenfluoride) hexafluoropropylene, poly(tetrafluoroethylene), poly(methyl methacrylate), poly(sulfonamide), poly(acrylamide), poly(vinylchloride), acrylonitrile, poly(vinylfluoride), Kel F™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxydes of Ti, Al, B and Zr, and any combinations thereof.

The proton conducting membrane used in the fuel cell of the invention also comprises an acid. As opposed to the solid electrolyte membrane described for example in U.S. Pat. No. 5,599,638, wherein no acid is present in free form, the solid electrolyte membrane used in the fuel cell of present invention contains free acid molecules entrapped in the pores of the membrane. Alternatively, it may contain acid molecules bonded to the inorganic powder. The typical diameter of these pores is essentially smaller than 30 nm, preferably smaller than 20 nm, more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzen, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_3(CF_2CH_2)_nSO_3H$, $HO_3S(CF_2)_nSO_3H$ where n is an integer having a value of 1 to 9, Nafion™ ionomers, HCl, HBr, phosphoric acid, sulfuric acid and mixtures thereof HCl and HBr are not recommended for use in combination with noble metal catalysts like Pt.

The anode and the cathode comprise a catalyst layer and a porous backing layer. A preferred catalyst used at the anode is for example nano size platinum-ruthenium powder, while preferred catalysts used at the cathode are for example nano size platinum powder and alloys thereof with non noble metals, for example Ni, Co, and Fe. In such alloys the ratio between platinum and the metal (Pt:M atomic ratio) is between about 1:3 to about 3:1.

The backing layer is preferably made of carbon. This layer is porous and is used for support and at the same time for making electrical contact between the housing and the catalyst powder, which by itself is connected to the membrane.

The means for circulating an oxidizable fuel past the anode and for flowing oxygen or air past the cathode include also means for withdrawing carbon dioxide, unused fuel and water from the anode side and for withdrawing unused oxygen and water from the cathode side.

The present invention also provides a new integrated system for circulating gas and electrolyte in a $H_2/O_2$ fuel cell. According to such a system the proton conducting membrane does not dry out, the acid is not washed away and the cell can operate at high temperatures.

A typical oxidizable fuel used in the invention is methanol. However, the present invention also provides new effective organic fuels which undergo clean and efficient oxidation in the fuel cell. These fuels are organic molecules having either one carbon atom or when having two or more carbons, then there are no two adjacent alkyl groups. In addition, all carbons except for methyl groups, are partially oxidized. Examples of new fuels are glycerol, ethanol, isopropyl alcohol, ethylene glycol and formic and oxalic esters thereof, oxalic acid, glyoxilic acid and methyl esters thereof, glyoxylic aldehyde, methyl format and dimethyl oxalat.

BRIEF DESCRIPTION OF THE DRAWINGS

The present invention will now be described in more detail with reference to the accompanying drawings in which.

DETAILED DESCRIPTION OF THE INVENTION

Figure 1:
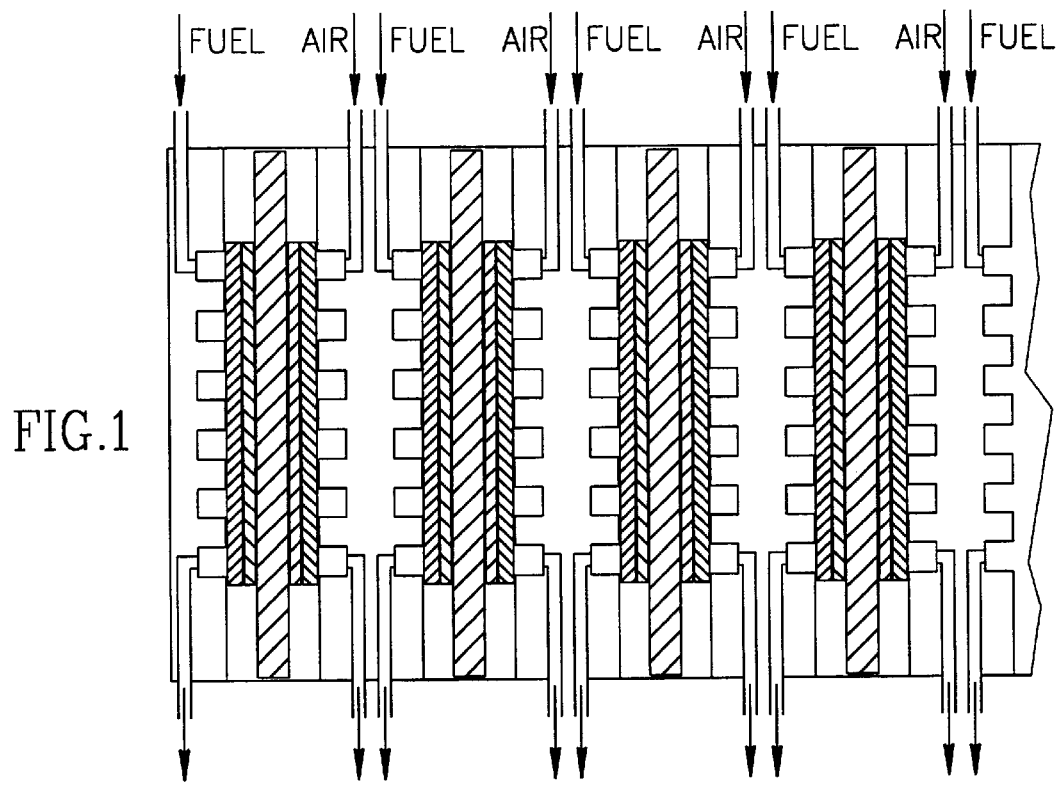
FIG. 1 shows a schematic representation of a multi-cell fuel system.

Referring to the figures, the preferred embodiments of the invention will be described and exemplified.

As mentioned above, the fuel cell of the invention comprises a housing, a solid electrolyte membrane having a first and a second surface, disposed in the housing to partition it into an anode side and a cathode side, an anode and a cathode each comprising a catalyst layer and a carbon backing layer and being formed on the first and second membrane surfaces respectively, so as to connect the first surface to the anode side and the second surface to the cathode side. The anode side comprises means for storing an oxidizable fuel or for circulating it past the anode and the cathode side comprises means for flowing oxygen or air past the cathode.

The anode, the cathode and the solid electrolyte membrane are preferably hot pressed so as to form a single structure unit. A pump is provided for pumping the fuel, for example a water solution comprising acid and an organic fuel such as methanol. This acid-fuel solution is circulated into the anode chamber of the housing, while an oxygen or air compressor provides oxygen or air into the cathode chamber. Carbon dioxide formed in the anode compartment is vented and the fuel solution is recirculated. To the acid-fuel solution it is possible to add, according to the present invention, a soluble catalyst such as a macrocyclic complex of nickel, cobalt or iron. Such a complex may promote the oxidation of the fuel and/or the reduction of the oxygen.

The solid electrolyte membrane is a proton conducting membrane (PCM) and it comprises pores with a typical diameter size which is essentially smaller than 50 nm, preferably smaller than 3 nm, more preferably smaller than 1.5 nm.

It is shown in detail hereinbelow, that in comparison to current-art Nafion™ membranes, the PCMs used in the fuel cell of the present invention have a better conductivity, lower crossover for methanol or other small molecule fuels, is not affected by heavy metals impurities and can be used at temperatures even higher than 100° C. or lower than 0° C. Furthermore, the cost of the PCMs is lower by about two orders of magnitude than that of current-art Nafion™ membranes, thus lowering the price of the entire fuel cell.

Fuel crossover, i.e. the undesired permeation of the fuel molecules through the electrolyte membrane, thus lowering the operating potential of the fuel cell, is a known phenomenon that occurs in fuel cells. The rate of crossover is proportional to the permeability of the fuel through the solid electrolyte membrane and increases with increasing concentration and temperature. For example, the crossover current density for a Nafion™ 117 membrane, in 1M methanol at 60° C. is 140 mA/cm$^2$, while that of the PCM used in the present invention is 18.5–25 mA/cm, at 65° C. and 31.8 mA/cm at 75° C. It has been found by the present inventors that the permeability of the solid electrolyte membrane to the liquid fuel can be reduced with minor effect on the conductivity, by changing the membrane properties such as pore size diameter, pore's neck diameter, by filling these pores with proton conducting materials or by adding salts to the electrolyte.

Nafion™ membranes have typical pore size of 3 nm while the electrolyte membranes used in the fuel cell of the invention have a typical pore size smaller than 1.5 nm. Therefore, the PCMs used in the invention are less permeable to methanol or other liquid fuels, in comparison to Nafion.

In addition, it has been found that fuel crossover may be further reduced by filling the pores of the PCM with a $Na_2SiO_3$ solution and hydrolyzing the silicate in sulfuric acid to form in the pores nano particles of hydrated silica or silicic acid. Alternatively, this effect can also be achieved by filling the pores with a polyhetroacid such as $H_3PW_{12}O_{40}$ or $H_4SiW_{12}O_{40}$ and preferably hot pressing the PCM so as to reduce the size of the pore's neck and to lock the acid in the pores. Fuel crossover may also be reduced by lowering the concentration of the fuel or by choosing a fuel having a molecular size larger than that of methanol, thus having a smaller diffusion coefficient. Examples of such fuels are oxalic acid, dimethyloxalat (DMO), methylformat, ethylformat, dimethoxymethane, trimethoxymethane, ethylen glycol, and trioxane. It should be noted that the above materials can function as fuels in any fuel cell comprising proton conducting membrane.

A direct oxidation fuel cell is a fuel cell in which the organic fuel is directly fed into the fuel cell without any previous chemical modification and the fuel is oxidized at the anode. Direct oxidation fuel cells (DOFC) offer a considerable weight and volume advantage over the indirect fuel cells. Direct oxidation fuel cells use either a vapor or a liquid feed of the organic fuel. Current art direct oxidation fuel cells that have shown promise typically employ a liquid feed design in which an aqueous solution of the organic fuel (mainly methanol) is circulated past the anode of the fuel cell.

As mentioned above, the rate of crossover is proportional to the permeability of the fuel through the solid electrolyte membrane. Fuels having a large molecular size like dimethyloxalat or ethylene glycol have a smaller diffusion coefficient than fuels which have smaller molecular size such as methanol. Hence, choosing a fuel having a large molecular size can reduce permeability.

Fuels with high boiling points, such as ethylene glycol or glycerol, have low vapor pressure and their transport through the membrane is mainly in the liquid phase. Since the permeability for vapors is higher than liquids, fuels with high boiling points generally have a low crossover rate.

The use of solid fuels, like for example DMO, in small liquid feed fuel cells (LFFC) has several advantages over the use of liquid fuels like methanol. These include ease in handling the solid fuels and a smaller fuel crossover current due to the limited solubility of the solid fuel (the solubility of DMO is only 6 g in 100 g of water while methanol is completely miscible). As a result it is possible to add the solid fuel, like DMO, directly to the anode compartment.

However, one of the problems when using small LFFC is the release of $CO_2$ from the anode compartment. This is associated with an orientation problem. For example, a small device like a cellular phone never has a fixed orientation therefore the liquid fuel may leek through the $CO_2$ exhaust port. A way to solve this problem is to cover one wall of the fuel tank, preferably the back side (wall), with a thin hydrophobic porous matrix and to make one or more holes in the back side of the fuel tank through which $CO_2$ is released. The hydrophobic layer is permeable for the gas only while the fuel solution remains in the tank. Examples for hydrophobic porous layers are: teflonated Toray™ paper or any teflonated porous thin matrix.

It has been found that the crossover of methanol in the fuel cell of the invention may be further reduced, by adding to the acidic fuel solution salts such as zinc, aluminum, potassium, sodium, cobalt, manganese, nickel or magnesium sulfates, in the form of hydrates. These salts should be compatible with oxygen, with the catalysts and with the fuel and do not form electronically conductive residues when dry. Examples for such hydrates are $ZnSO_4.7H_2O$ (280), $Al_2(SO_4)_3.18H_2O$ (86), $MgSO_4.7H_2O$ (150), $NiSO_4$, $CoSO_4.7H_2O$ (96.8), $MnSO_4.7H_2O$ (280). They are characterized by high decomposition temperatures (written in the brackets) indicating a strong bonding of water. Some of these hydrates can function as molten hydrates at elevated temperatures. The reduction of water vapor pressure is important for operation of the fuel cell at temperatures higher than 100° C. At these temperatures co-generation of heat and electricity is possible leading to a higher energy conversion efficiency. In addition, at high temperature of operation the fuel cell can tolerate higher concentrations of CO and smaller amounts of expensive catalyst is needed. As the fuel solution contains acid, it freezes below 0° C. For example, a 27% $H_2SO_4$ solution freezes at −27° C.

As mentioned above, the PCM used in the fuel cells of the invention is not affected by heavy metal impurities, while Nafion is very sensitive to heavy metals impurities. For example, 500 ppm chromium reduced the conductivity of a Nafion based membrane by a factor of eight from 0.1 S/cm to 0.013 S/cm (Warthesen and Shores Extended Abstract Vol. 33 $^{rd}$). The same concentration of iron, which has similar effect on conductivity as chromium, did not significantly affect the conductivity of the PCM used in the invention. The tested PCM consisted of (V/V) 24% PVDF (polyvinilyden fluoride), 16% $SiO_2$ and 60% 3M sulfuric acid. The conductivity measured without iron impurities was 0.18 S/cm, while that measured in the presence of 500 ppm iron sulfate was 0.17 S/cm. This feature of the PCM used in the invention is very important and unique as it enables the use of catalysts consisting of non noble metals or Pt alloys with non-noble metals (M) such as Fe, Ni or Co. It was found that Pt-M alloys are much better catalysts for oxygen reduction and the preferred ratio Pt-M is between 1:3 to 3:1. These results also make possible the use of metals like super alloys and low corrosion stainless steel alloys for the fuel cell hardware and for peripheral subsystems with smaller risk of affecting the conductivity of the membrane.

The catalyst used for the air (oxygen) cathode is commonly nano particles (preferably 2–5 nm) of Pt or Pt alloys where the one used at the methanol anode is a Pt—Ru alloy of nano size (preferably 5–10 nm ) particles. However, in order to save the cost of expensive noble metals, it is possible to use non noble metal based alloys such as for example Ni, Fe or Co and coat them with the required noble metal catalyst by common electrochemical or chemical processes. The thickness of such catalyst layer may be between less than one monolayer to 20 monolayers.

As a result of long operation, the bond between the catalyst particles and the supporting carbon matrix is lost leading to the degradation of the fuel cell. In view of that it is proposed in the present invention to bind the nano size catalyst to a nano size ceramic powder and subsequently bind the obtained particles to the carbon backing layer and to the PCM. A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size of the catalyst particles. For a methanol anode it is preferred to form either a Pt—Ru alloy catalyst layer or to form two consecutive layers of Pt on Ru or Ru on Pt with atomic ratio of 1:10 to 10:1. Other elements, like Sn, Os, Ni can be added to the catalyst layer to further improve the kinetics of fuel oxidation. In the same way catalyst layers consisting of Pt or Pt nano size alloys with Co, Ni or Fe can be prepared for the oxygen cathode.

Generally, single cells are combined into a fuel cell stack to produce the desired level of electrical power. Such an assembly is shown schematically in FIG. 1, wherein a fuel consisting of a water solution comprising methanol and acid is circulated into the anode side of the housing, while an air compressor provides air into the cathode side.

An alternative PCM is obtained if the acid molecule is chemically bonded to the matrix, thus reducing or avoiding the insertion of acid in the fuel solution. According to this option the acid, preferably sulfonic acid, is chemically bonded to the inorganic powder directly or through an organic segment R selected from —$(CH_2)_n$—,—$(CF_2)_n$—,—$CF_2CH_2)_m$—, where n is an integer from 1 to 10 and m is an integer from 1 to 5, perfluoroaryl, polyfluoroaryl, perfluorostyrene, polyflouro styrene and similar segments where up to 50% of the hydrogen or fluorine atoms were replaced by chlorine atoms.

A procedure to form sulfonic acid groups bonded to silica is described hereinbelow: nano size silica powder is boiled in pure water for two hours to form surface rich OH groups. Than the hydrated powder is immersed in a solution of cloro or methoxy (or alkoxy) organo sulfur silan of the type $CH_3COSR$—$Si(OCH_3)_3$ or $CH_3COSR$—$SiCl_3$, where R is one of the organic segments listed above. The silan reacts with the surface OH groups of the silica powder to form up to one monolayer of the organic sulfur silan. Than the powder is oxidized by air and the thioacetat group is converted into a sulfonic acid group. This step is described in the following equation: $SiO_2$—R—S—$C(O)CH_3$+$O_2 \rightarrow SiO_2$—R—$SO_3H+2CO_2+H_2O$. The obtained chemically bonded sulfonic acid is stable in strong acids at 90° C. and, therefore, it may be used in the preparation of a PCM for fuel cell applications, instead of pristine $SiO_2$.

The present invention also provides an improvement in hydrogen/oxygen fuel cells which use the PCM as its electrolyte, as opposed to current art Nafion based electrolyte membranes. According to this improvement, a new integrated gas—acid solution flow system (shown in FIG. 2) was designed in order to prevent changes in electrolyte concentration during fuel cell operation. In this system two integrated sets of flow channels are engraved into the cell housing, as opposed to one set of flow channels generally employed in fuel cells. In one set of channels reactant hydrogen gas is flowing and in the second set an aqueous acid solution (i.e. electrolyte) is circulating. The electrolyte pressure in the integrated flow field system can be equal, higher or lower then the reactant gas pressure. If it is desired to prevent from reactant gas to penetrate into the flow channels of the electrolyte, a higher electrolyte pressure will be used. At the contrary, if it is desired to prevent the electrolyte from penetrating into the gas flow channels, a lower electrolyte pressure will be used. If both effects are equally undesired, equal pressures of electrolyte and reactant gas will be used.

When preparing the integrated flow field system in the housing of the fuel cell, the maximum allowed distance between adjacent electrolyte and gas flow channels would usually be a factor of the membrane capillary forces. The ratio of electrolyte flow channels to gas flow channels will usually be determined by individual system optimization and by comparing the need to supply electrolyte versus the need to supply reactant gasses.

Figure 2:
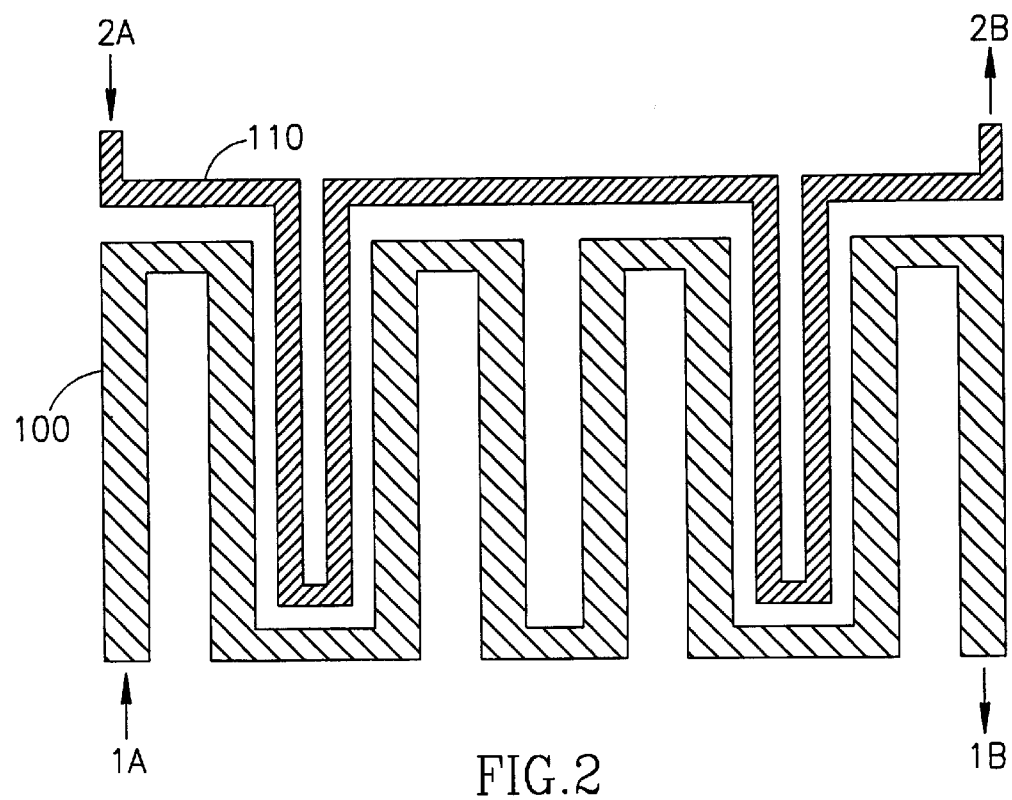
FIG. 2 shows an integrated gas—acid solution flow field system used in a hydrogen/oxygen fuel cell.

In FIG. 2 an integrated flow system is shown schematically. Through the channel 100 a reactant gas, i.e. hydrogen, (entrance at 1A and exit at 1B) flows, while through the channel 110 the electrolyte (entrance at 2A and exit at 2B) is circulated. In the flow system shown schematically in FIG. 2 the ratio of electrolyte flow channels to gas flow channels is 1:2 and the maximum distance between adjacent electrolyte flow channel and gas channel is 8 mm.

The integrated flow field system of the invention can be formed either on the anode side or on the cathode side or on both sides.

The integrated flow field system can also be used as a part of the temperature control system, or as a part of the water removal system (by controlling water vapor pressure via temperature gradient).

While the above embodiments where explained in detail, the following improvements are also part of the invention and may be utilized in any fuel cell comprising a proton conducting membrane. Examples of such proton conducting membranes, except for the PCM described in the present invention, are Nafion™, perfluorinated sulfonic acid polymer membranes such as Aciplex™ (manufactured by Asahi Glass Co., Japan), polymer membranes made by Dow Chemical Co. such as XUS13204.10, membranes of polyethylene and polypropylene sulfuric acid, polystyrene sulfuric acid and other polyhydrocarbon-based sulfuric acids (such as membranes made by RAI Corporation, USA), polyfluoro-polyaryl sulfonic acid, perfluoro-polyaryl sulfonic acid, and the like or composite membranes consisting of two or more types of proton conducting cation-exchange polymers with various acid equivalent weight and chemical composition.

1. Hybrid Power Sources

Direct methanol fuel cell (DMFC) and liquid feed fuel cells are low power sources. However, devices like cellular telephones, computers and small electric vehicles need high power for short times. For these and for similar applications it is possible to combine a fuel cell with a small high power rechargeable battery, which supplies the high power when required. Such a combination is called hybrid power source. Today DC to DC converters can start working from 0.7V. As a result it is possible to combine two or three fuel cells (in a series combination) through a DC to DC converter to a battery. The fuel cell charges the battery and in parallel supplies the low power demand while the high power battery supplies the heavy loads. This enables the use of a flat and thin fuel cell and eliminates the need for building fuel cells with many cells.

For example, to power a cellular phone it is possible to use a hybrid power source built of two thin fuel cells, connected in a series combination and fueled by a solid fuel like DMO, a DC to DC converter and a small high power lithium ion cell.

2. Water Balance Mechanism

In any fuel cell the protons that cross through the proton conducting membrane carry with them about three water molecules per proton. In a DMFC six protons move through the membrane for each methanol molecule. It means that 18 water molecules are carried out by the protons per each methanol molecule that was oxidized.

This phenomenon causes a big loss of water. Usually, in order to minimize water loss, the water from the exhaust of the fuel cell are collected and recycled. A new way to minimize water loss is suggested here. It was found that the application of excess pressure in the cathode compartment causes a decrease in the methanol crossover. Each 0.1 atmospheres excess gas pressure causes a decrease of about 10% in the crossover current (for example, at 1M methanol and at 60 degree C. it decreases by 7 mA/cm$^2$, from 70 mA/cm$^2$ to 63 mA/cm$^2$). This is explained by hydraulic stream of the fuel solution from the cathode side to the anode side. As the water methanol ratio is about 53:1, the back stream of water by this effect is equivalent to 7×53 or 371 mA/cm$^2$, or to a water flux of 0.371×10$^{-6}$ moles per sec.cm2. This effect can be utilized as water return mechanism in any fuel cell comprising a proton conducting membrane. At steady state the protons current equals the external load electronic current and the water flux carried out by the protons is three times larger. As a result at a load of 100 mA/cm$^2$ the water flux is equivalent to 300 mA/cm$^2$ and an excess pressure of 0.1 atmospheres may be enough to return the water back from the cathode side to the anode side. A water (or fuel solution) level sensor can be installed in the water (or fuel solution) tank and the air or oxygen pressure at the cathode compartment will be controlled to keep this water (or fuel solution) level constant.

The invention will be further described in more detail in the following non-limiting examples.

EXAMPLE 1 a) First Fuel Cell Configuration

A fuel cell housing was fabricated from synthetic graphite plates purchased from Globetech Inc., in which a flow field was engraved.

The anode was formed using a platinum-ruthenium ink that was spread on a carbon fiber sheet commercially available from Toray™ paper. Several types of inks were prepared, as follows:

1. Type A was prepared by mixing 600 mg of 60% Pt:Ru on Vulcan XC-72 (purchased from E-Tek Inc), 60 mg Kynar 2801 PVDF, 0.26 ml propylene carbonate (PC) and about 1.5 ml of cyclopentanon;
2. Type B was prepared by mixing 600 mg of 20% Pt/ 10% Ru/ Vulcan C-72 (purchased from ElectroChem, Inc), 60 mg Kynar 2801 PVDF, 0.38 ml propylene carbonate (PC) and about 1.5 ml of cyclopentanon;
3. Type C was prepared by mixing 600 mg of 20% Pt/ 10% Ru/ Vulcan XC-72 (purchased from ElectroChem, Inc), 60 mg Kynar 2801 PVDF, 60 mg Aerosil 130 (purchased from Degussa AG), 0.42 ml propylene carbonate (PC) and about 1.5 ml of cyclopentanon.

The inks were magnetically stirred over night and then 3–4 layers were painted by a paint brush on the Toray™ paper.

The cathode was formed by painting a Pt ink on teflonated Toray™ paper. The ink was prepared by mixing 600 mg of 80% Platinum on Vulcan XC-72 (purchased from E-Tek, Inc), 60 mg Kynar 2801 PVDF, 0.17 ml propylene carbonate (PC) and about 1.5 ml of cyclopentanon.

The PCM was manufactured by mixing 14.87 g of powdered Kynar PVDF 2801-00 and 12.88 gr of high surface area, 16 nm particle size silicon dioxide, >99.8% (Degussa), with 150 ml of cyclopentanon and 21 ml of propylene arbonate (PC). Part of the viscous mixture obtained, was poured onto K control coatter (R K Print, Coat Instruments) and a film was made by using doctor blade method. The film was allowed to dry at room temperature for several hours and n elastic, strong, transparent film was obtained.

The film was washed by using double distilled water in order to remove he PC. Following the washing, a catalyst layer (Pt:Ru or Pt, depending on the electrode) was painted on the outer side of the membrane. Following this step, the film was immersed in 30% wt $H_2SO_4$ for 1.5 hours at 60° C or over night at room temperature. After cooling the film was placed between the Toray papers, a polypropylene sealing was inserted and the cell was assembled. The impedance of a six cm cell thus obtained was measured by using AC impedance spectroscopy Solartron model SF 1260 and was found to be smaller than 0.1 ohms (at 25°±3° C).

Other cells were manufactured by hot pressing a PCM sandwiched between two Toray™ papers coated by proper catalysts, at temperatures between 70 and 130° C.

Figure 3:
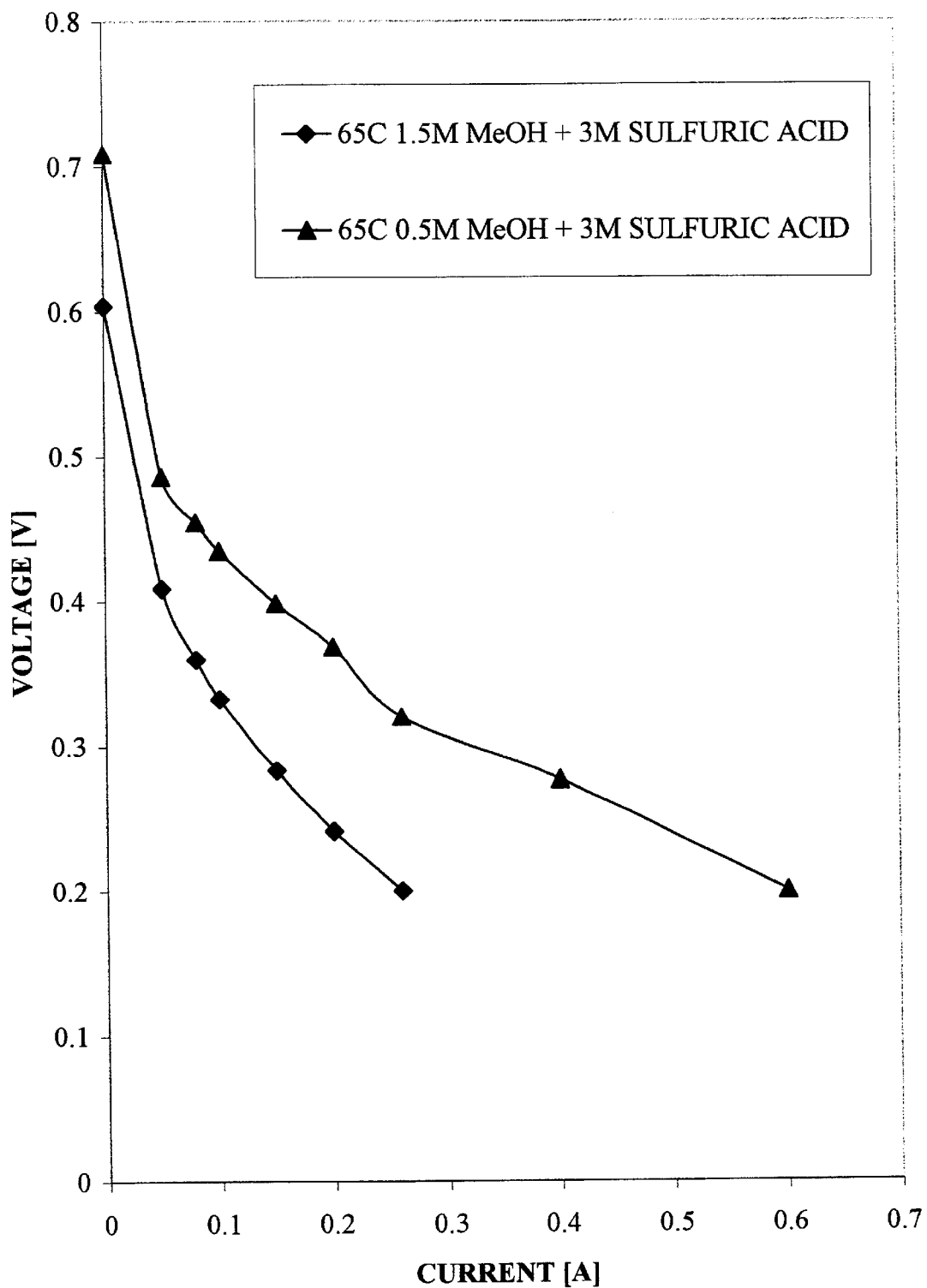
FIG. 3 shows a graph illustrating polarization curves at different methanol concentrations.

During fuel cell operation an aqueous solution containing acid and 0.4–2 mole/liter methanol was circulated past the anode (with the use of a peristaltic pump type) at different flow rates, from 1 to 20 ml/min. FIG. 3 shows polarization curves for different methanol concentrations.

Figure 4:
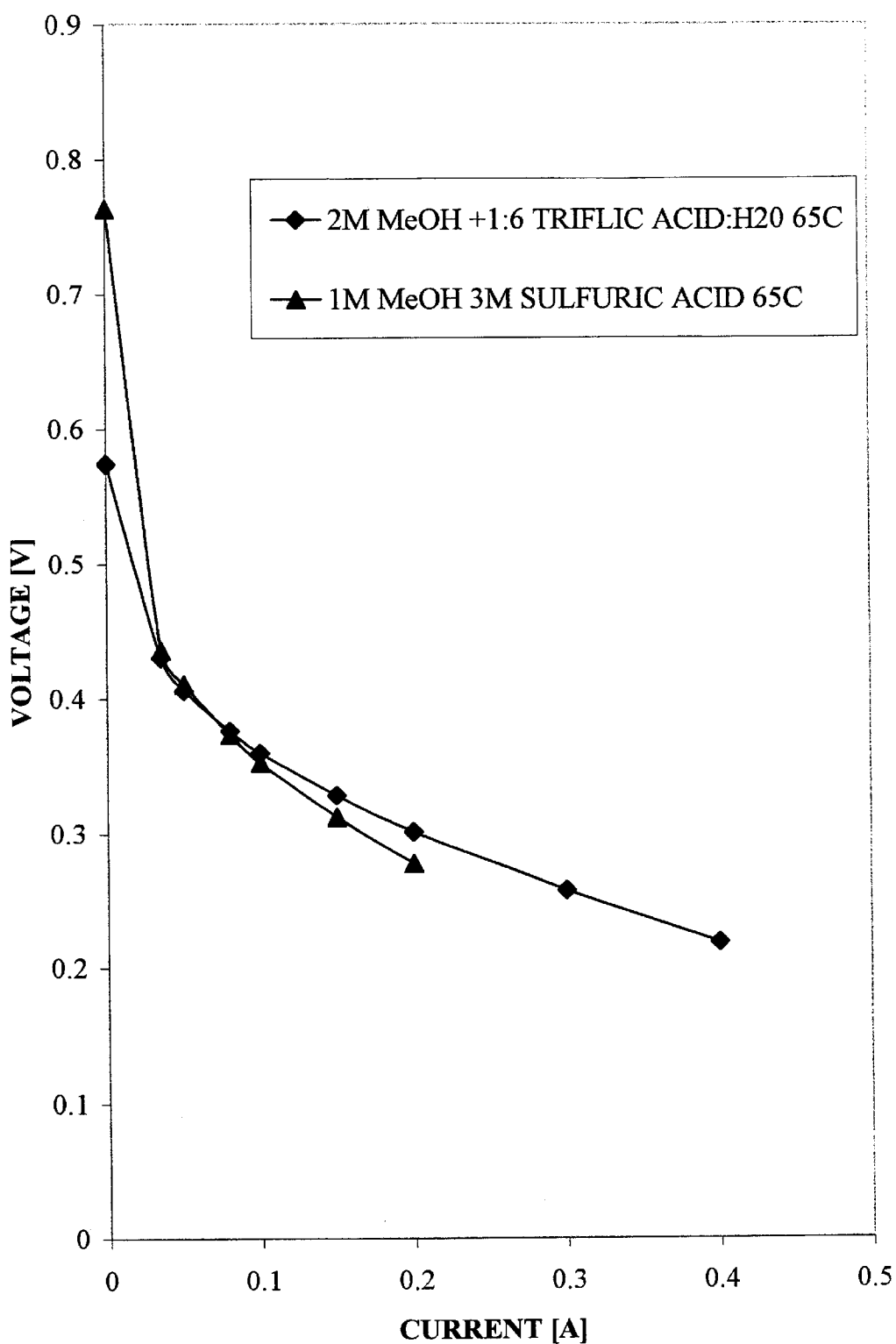
FIG. 4 shows a graph illustrating polarization curves for different acids.

The following acids and acid concentrations were tested: 1–3 mole/liter $H_2SO_4$, 1:3–1:6 mole ratio $CF_3SO_3H:H_2O$ and 40% (w/w) aqueous PWA (i.e. $H_3PW_{12}O_{40}$) solution. FIG. 4 shows polarization curves for two acidic, aqueous solutions, each containing 1. 3M $H_2SO_4$+1M methanol and 2. 1:6 (V/V) $CF_3SO_3H:H_2O$+2M methanol.

In the same manner additional fuel cells were built and other fuels such as formaldehyde, formic acid, methylformat, ethylformat, oxalic acid, glycerol, ethylene glycole and dimethyloxalat were tested.

b) Second Fuel Cell Configuration

A second cell configuration was manufactured by painting the anode side flow field and both sides of the anode Toray ™ paper with Pt:Ru ink. This modification was made in order to increase the catalyst content per square cm.

EXAMPLE 2

The crossover was measured by two test methods:

1. Using the regular configuration of the fuel cell but using nitrogen instead of oxygen at the anode and methanol in 3M $H_2SO_4$ at the cathode. The current (at 1V) measured is a product of the oxidation of the methanol that penetrated through the PCM from the cathode to the anode side.
2. The same as in Method 1 above but both electrodes were painted with Pt—Ru ink and the crossover current was calculated in the same way as in 1.

The crossover currents are summarized in Table 1. The crossover of 1 mole/liter methanol was measured at 50, 65 and 75° C.

TABLE 1

Crossover current densities at different temperatures and test methods (1 M methanol and 3 M sulfuric acid in H$_2$O).

| | Test method 1 | | Test method 2 | |
|---|---|---|---|---|
| Temperature [° C.] | current density [mA/cm$^2$] | Cell Voltage [v] | current density [mA/cm$^2$] | Cell Voltage [v] |
| 50 | 26 | 1 | 13 | 1 |
| 65 | | | 18.5 | 1 |
| 75 | | | 31.8 | 1 |

* The PCM consists of (V/V) 24% PVDF, 16% SiO$_2$, hot pressed at 70° C. The PCM thickness was 300 micron and it was 60% porous.

The measured crossover currents (at 1V) for the second cell configuration (with the Pt:Ru ink on the flow field) was 25.5 mA/cm$^2$ for 1 mole/liter methanol at 65° C and 58.3 mA/cm for 2 mole/liter methanol at 65° C.

The crossover current density for 0.1M oxalic acid was measured at 65° C. according to Method 1 and was found to be 0.3 mA/cm$^2$. The crossover current density for 0.1M dimethyl oxalate was measured at 65° C. according to Method 1 and was found to be 6 mA/cm$^2$.

Figure 6:
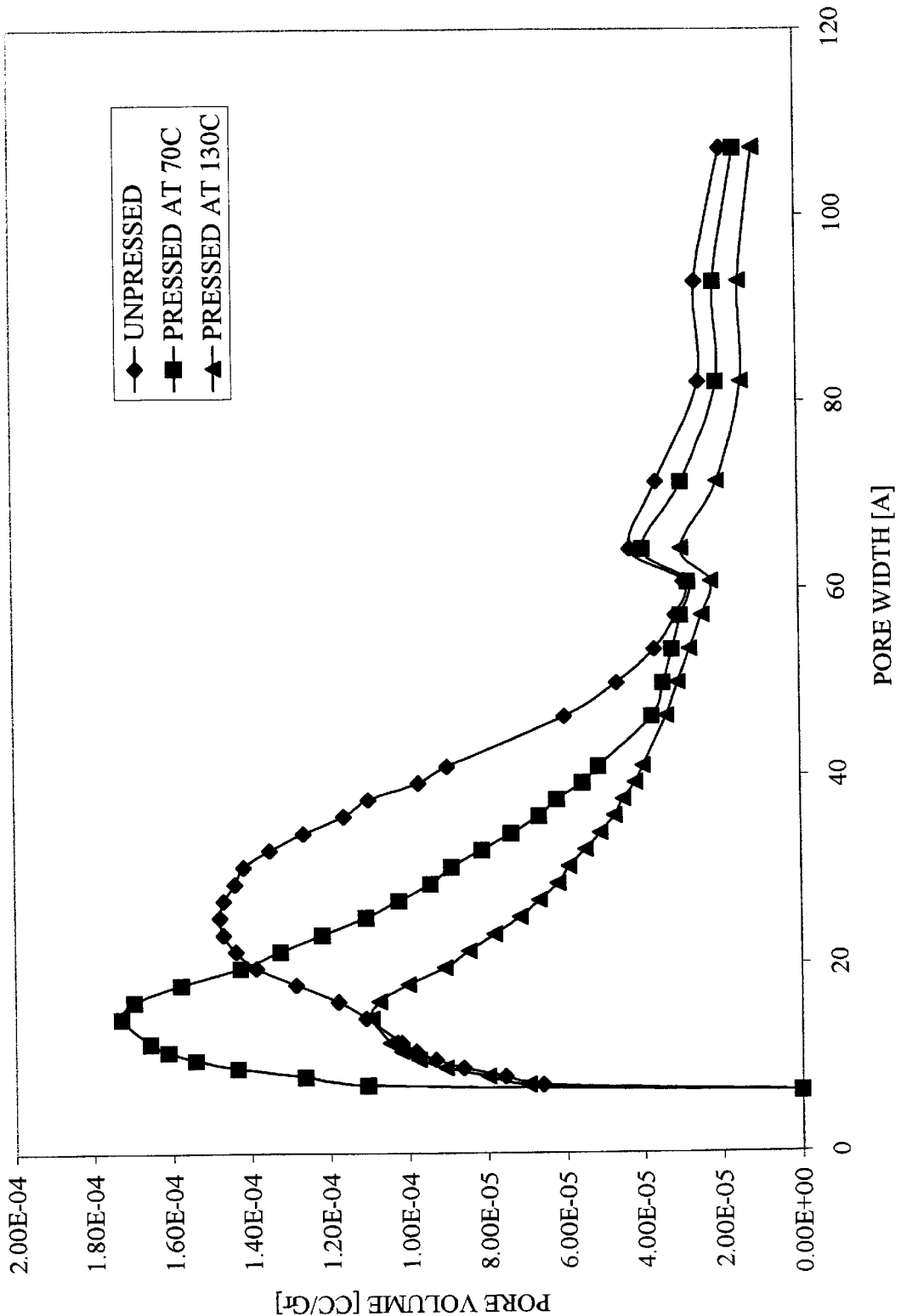
FIG. 6 shows a graph illustrating the relation between the pore size of PCMs and temperature of hot press

In order to reduce crossover of methanol through the PCM, the PCM was hot pressed at different temperatures between 70 and 130° C. The hot press was made in hydraulic press at about 40 Atmospheres for 30–250 seconds. As can be seen in FIG. 6 the pore size distribution, that was measured with Quantachrome NOVA 2200 Surface Area Analyzer, changed significantly upon the hot press. It was found that for an unpressed PCM, a significant volume of the material tested had pores dimension of less than 3 nm, while for a PCM that was subjected to hot pressing, a significant volume of the material tested had pores dimension of less than 1.5 nm. These nanozise pores have good retention capability for the acid and are small enough to reduce the methanol crossover.

Figure 5:
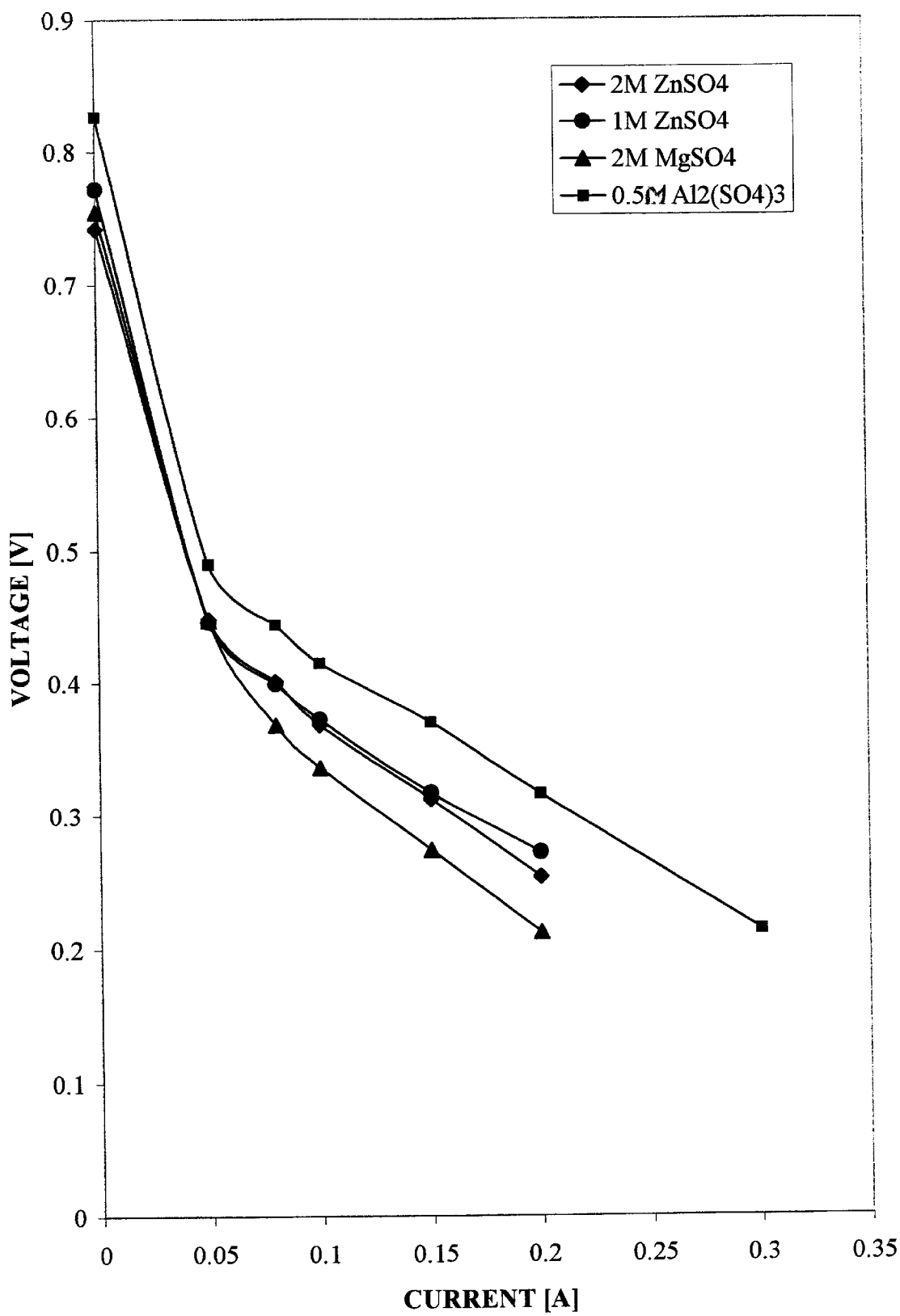
FIG. 5 shows a graph illustrating the effect of additives on polarization curves.

The effect of additives on the crossover is showed in Table 2 and in the polarization curves presented in FIG. 5. The PCM used consisted of (V/V) 24% PVDF, 16% SiO$_2$ hot pressed at 70° C., 60% 3 M sulfuric acid with the added metal sulfates. PCM thickness was 300 micron.

TABLE 2

Additive's influence on methanol crossover current, 1 M methanol, 65° C.

| Additive | Salt Concentration [M] | Crossover current density [mA/cm$^2$] |
|---|---|---|
| MgSO$_4$ | 2 | 10 |
| ZnSO$_4$ | 1 | 20.8 |
| ZnSO$_4$ | 2 | 11.2 |
| Al$_2$(SO$_4$)$_3$ | 0.5 | 13.5 |
| Control | 0 | 25.5 |

EXAMPLE 3

In order to improve performance, another methanol fuel cell was manufactured with the use of pure metal catalysts, instead of carbon supported catalysts. A cathodic catalyst ink was prepared by the following process: A nano powder Pt (Pt black, purchased from "Johnson Matthey"), Teflon™ emulsion and Nafion™ 5% solution were combined in the following weight proportions: 60% Pt, 25% Teflon emulsion and 15% Nafion. First the Pt powder and the Teflon emulsion were mixed by sonication for 15 minutes. After two sonication periods, the ink obtained was placed on a magnetic stirrer for at least one night.

An anodic catalyst ink was prepared by the following process: A Pt:Ru nano powder (Pt:Ru black 50% purchased from "Johnson Matthey") and PVDF were mixed in the following weight proportions: 91% catalyst powder and 9% PVDF. Propylene carbonate was added in an amount equal to 30–70% of the catalyst volume, then cyclopentanone was added and the ink obtained was stirred for at least one night.

Preparation of the electrodes: the cathode catalyst ink was applied on teflonated Toray™ carbon fiber paper, to form 4 mg Pt/cm$^2$. The ink (in the form of a paste) was spread in layers, allowing each layer to dry for about one hour, before the next layer was applied. This operation was repeated until the desired amount of catalyst was obtained. In the same way, the anode catalyst ink was applied on unteflonated Toray™ carbon fiber paper, until 5–10 mg catalyst/cm was obtained. Both electrodes were washed with 3M sulfuric acid and then with water.

The cathode was hot pressed under a pressure of 10–70 Kg/cm, at a temperature of 85–130° C. to one side of a PCM with a thickness of 100–300 μm. The anode was placed on the other side of the PCM, parallel to the cathode and the complete cell was assembled.

Figure 7:
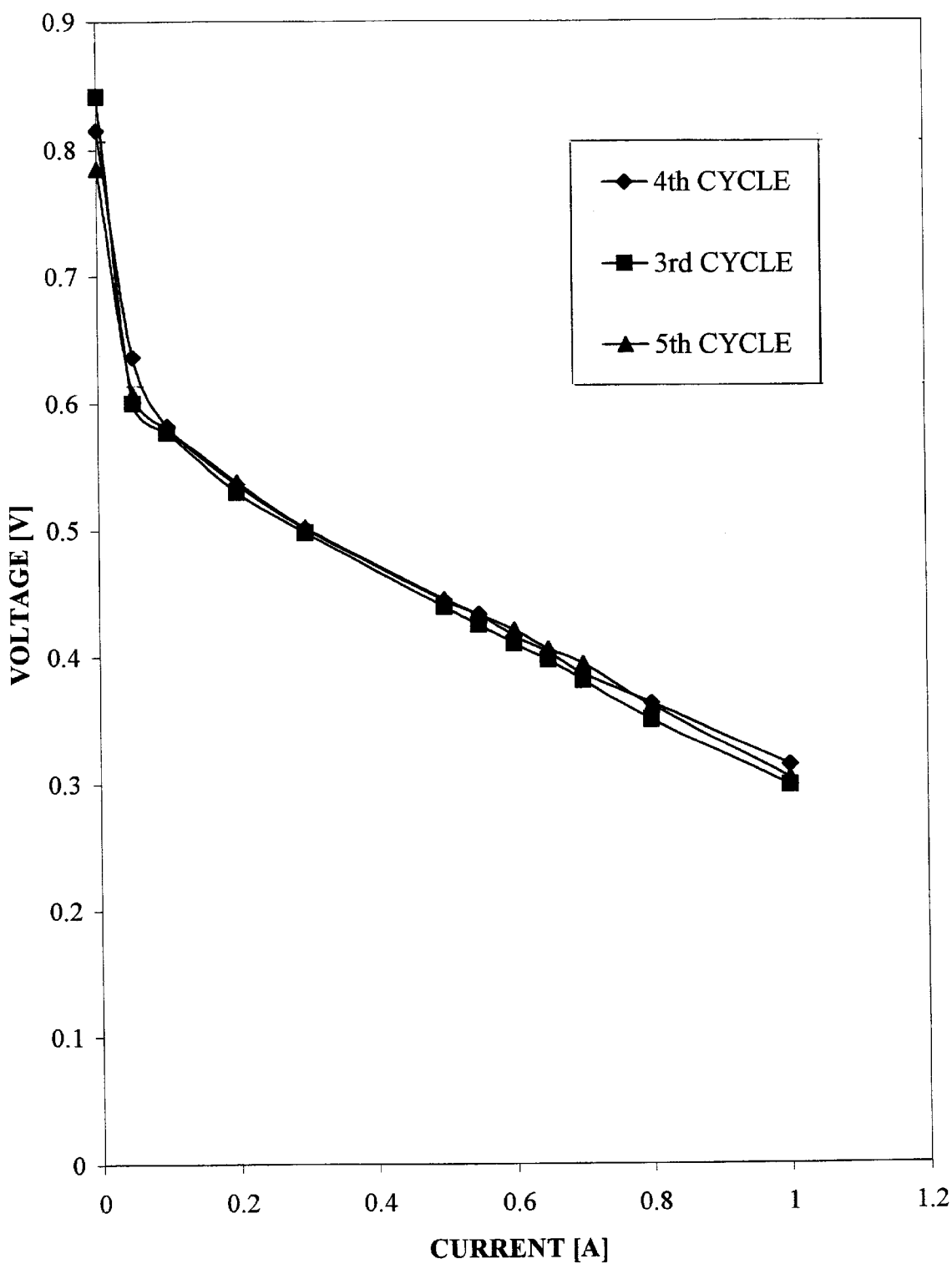
FIG. 7 shows a graph illustrating three consecutive polarization curves (3M $H_2SO_4$+1M MeOH at 65° C.).

FIG. 7 illustrates three consecutive polarization curves for this kind of fuel cell, under the following conditions: a solution of 1M MeOH and 3M H$_2$SO$_4$ was circulated through the anode at a rate of 9 ml/min. Oxygen was circulated past the cathode at a pressure of 0.25 atm. over the atmospheric pressure. The cell temperature was 65° C. A 300 micron thick PCM consisting of (V/V) 16% nanosize powder of SiO$_2$, 24% PVDF and 60% pore volume, of 1.5 nm typical diameter. The cell demonstrated over 100 hours of stable operation at 0.4V. After 100 hours of operation the current change was less then 3%.

Figure 8:
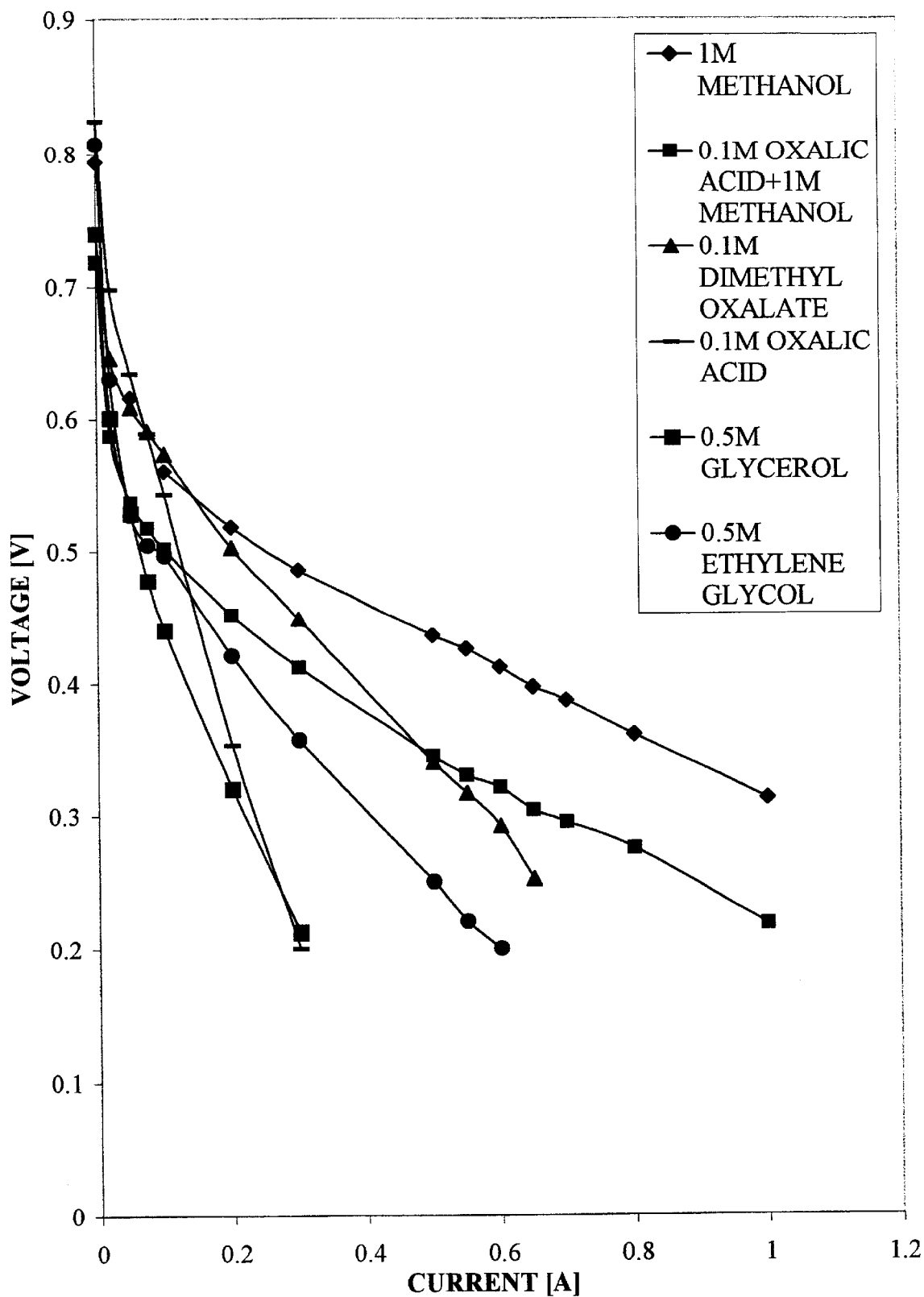
FIG. 8 shows a graph illustrating polarization curves obtained for several fuels, each containing 3M $H_2SO_4$, at 65° C.: 0.1M oxalic acid; 0.1M dimethyl oxalate; 0.5M glycerol; 0.5M ethylene glycol; 1M methanol; 1M methanol+0.1M oxalic acid.

FIG. 8 illustrates polarization curves obtained with the same fuel cell but with various fuels. Solutions of oxalic acid, dimethyl oxalate, ethylene glycole, or glycerol in 3M sulfuric acid were circulated over the anode, under the same conditions as described above.

In order to prove a complete utilization of oxalic acid we carried out the following test: a 50 ml solution of 0.1M oxalic acid in 1.5M sulfuric acid was circulated, and the total charge delivered by the cell was 0.25 Ah, which is over 93% fuel utilization, based on 2e/oxalic acid molecule ((COOH)$_2$-2e-2H$^+$→2CO$_2$). The total charge delivered by the cell when a 50 ml solution of 0.5M glycerol in 3M H$_2$SO$_4$ was circulated, was 2Ah, at an average current of 0.1 A.

Figure 11:
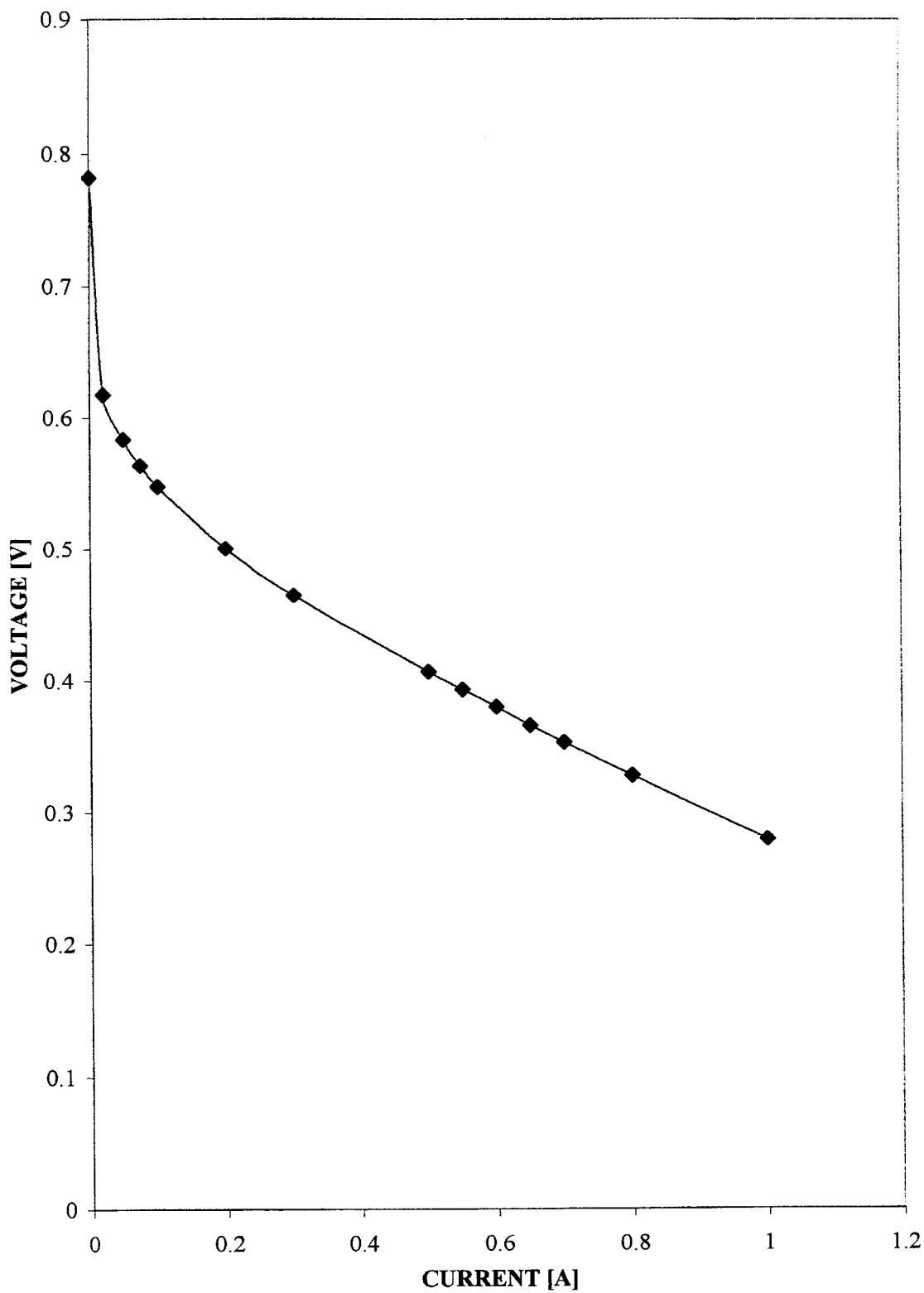
FIG. 11 shows a graph illustrating the polarization curve of a cell operating with a solution of 1M MeOH in 3M sulfuric acid.

Other cells were built according to the same procedure described above, but using another cathode ink. This cathode ink consisted of (weight %) 0–5% nanosize SiO$_2$, 20–40% Teflon and 40–80% nanosize Pt powder. FIG. 11 illustrates the polarization curves of these cells, operating with a solution of 1M MeOH in 3M sulfuric acid.

EXAMPLE 4

H$_2$/O$_2$ Fuel Cell

We engraved an Integrated Flow Field System into a graphite housing. The system is schematically described in FIG. 2. In this system the ratio of the electrolyte flow channels to gas flow channels is 1:2 and the maximum distance between adjacent electrolyte flow channels is 8 mm. We have fabricated a fuel cell system with an Integrated Flow Field System at the anode side. We then attached the fuel cell to gas providing systems that combined with an electrolyte circulating system. This system is built in such a way that the hydrogen and the electrolyte pressures at the Integrated Flow Field System are equal. The gas/electrolyte providing system is shown schematically in FIG. 9.

Figure 9:
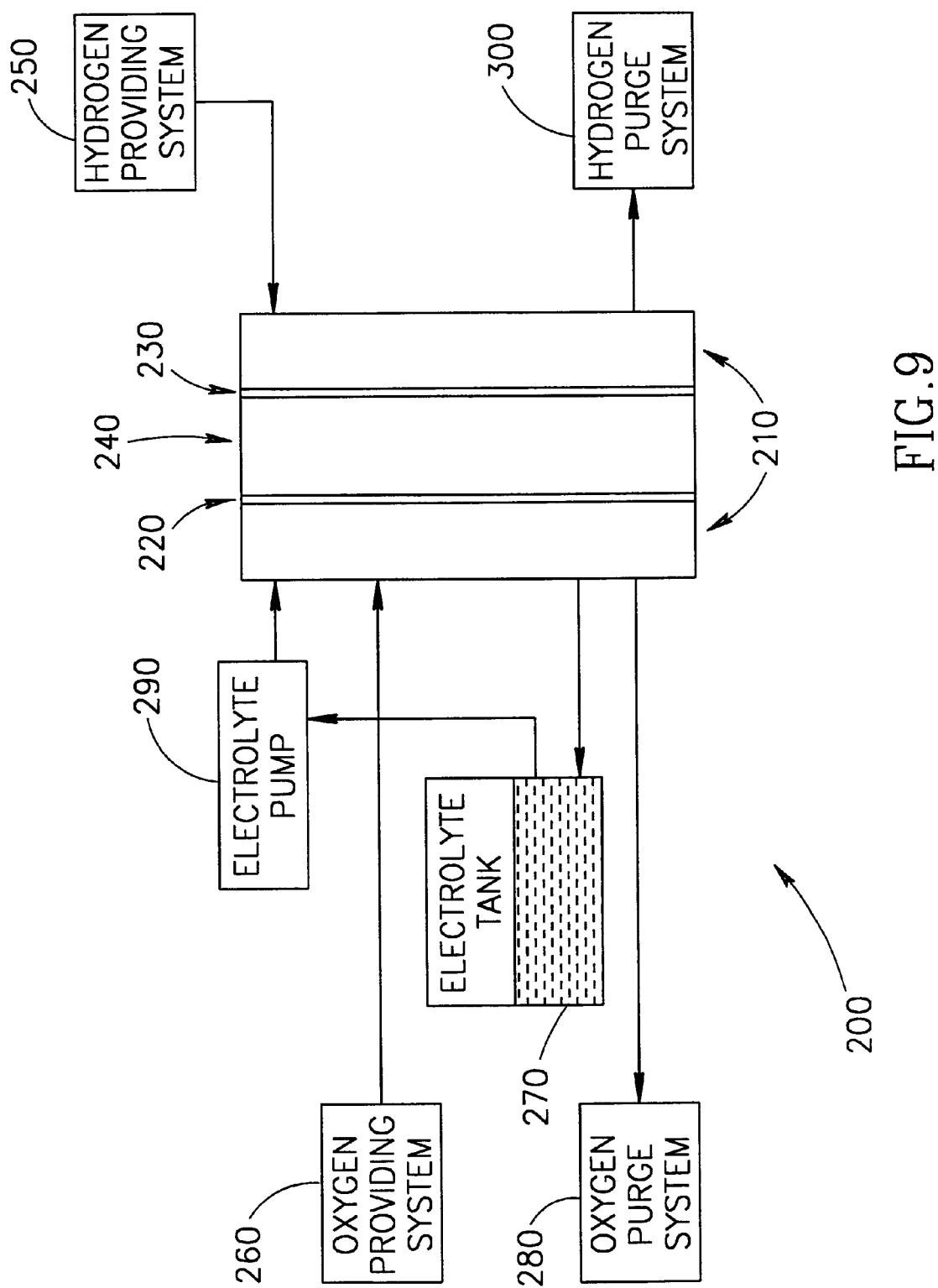
FIG. 9 shows a schematic representation of a $H_2/O_2$ fuel cell with integrated gas-acid flow field.

FIG. 9 illustrates a $H_2/O_2$ fuel cell 200 having a housing 210, an anode 220, a cathode 230 and a solid PCM 240. A hydrogen gas providing system 250 provides hydrogen to the fuel cell. An oxygen providing system 260 supplies oxygen either directly (as shown in FIG. 9) or via the electrolyte tank 270 in order to achieve an equalization in pressures. The cell further comprises an oxygen purge system 280, an electrolyte pump 290 and a hydrogen purge system 300. The pump we used was a peristaltic pump and the electrolyte was 1.5 M sulfuric acid.

Figure 10:
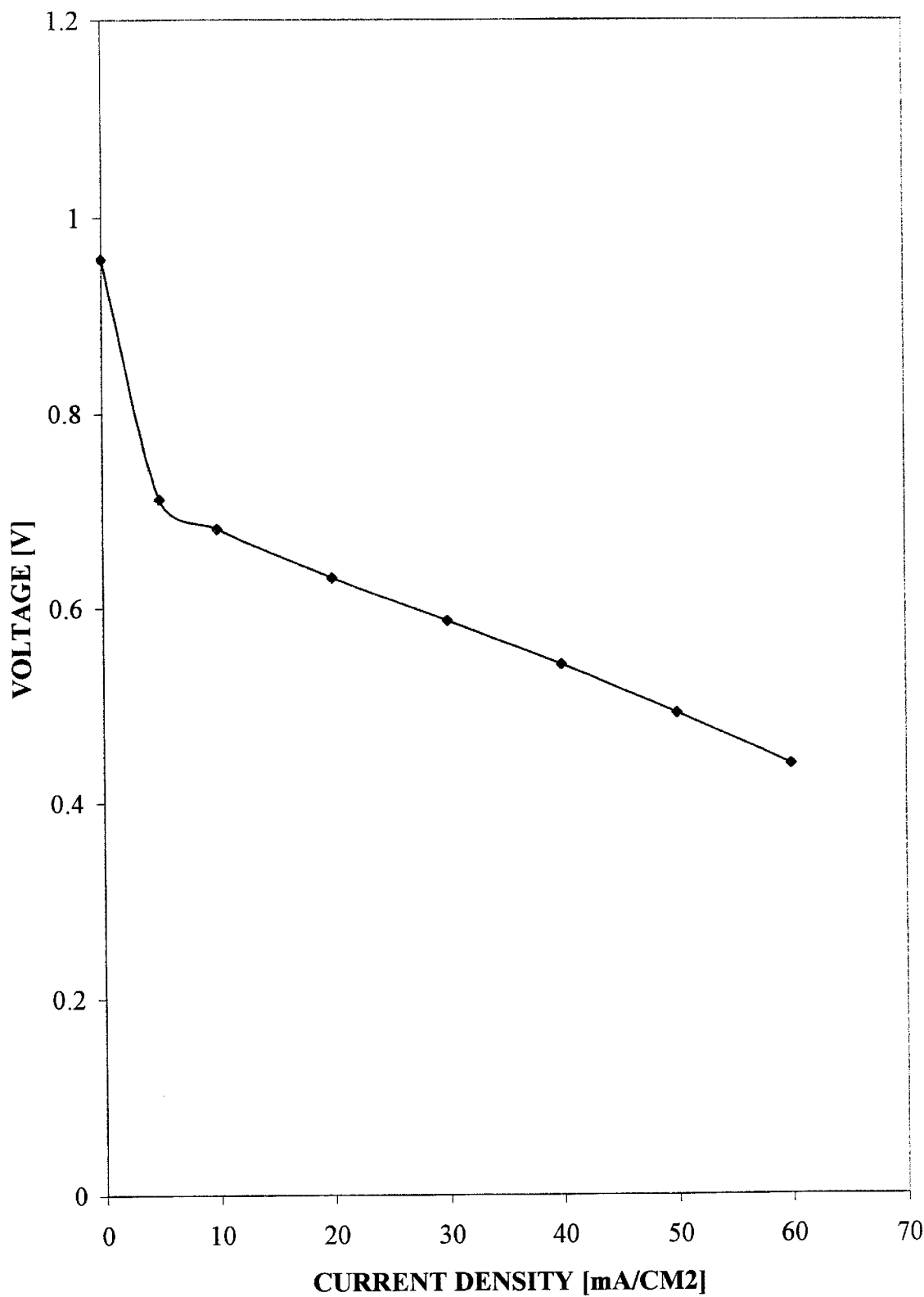
FIG. 10 shows a graph illustrating a polarization curve for a $H_2/O_2$ fuel cell (25° C., 1 psi $H_2$ and $O_2$ pressure).

FIG. 10 shows a polarization curve for this fuel cell, at 1 PSI (over atmospheric pressure) hydrogen and oxygen pressure, at room temperature (about 25° C.). The electrolyte was circulated at 9 ml/min.

EXAMPLE 5

The low fuel crossover enables the use of the fuel cell of the invention as a replacement for a primary battery. In this case, a fuel-acid solution is not circulated but is stored in the anode side (compartment) in a porous carbon matrix. The air inlet ports may be closed by adhesive tape when this fuel cell is not in use.

Figure 12:
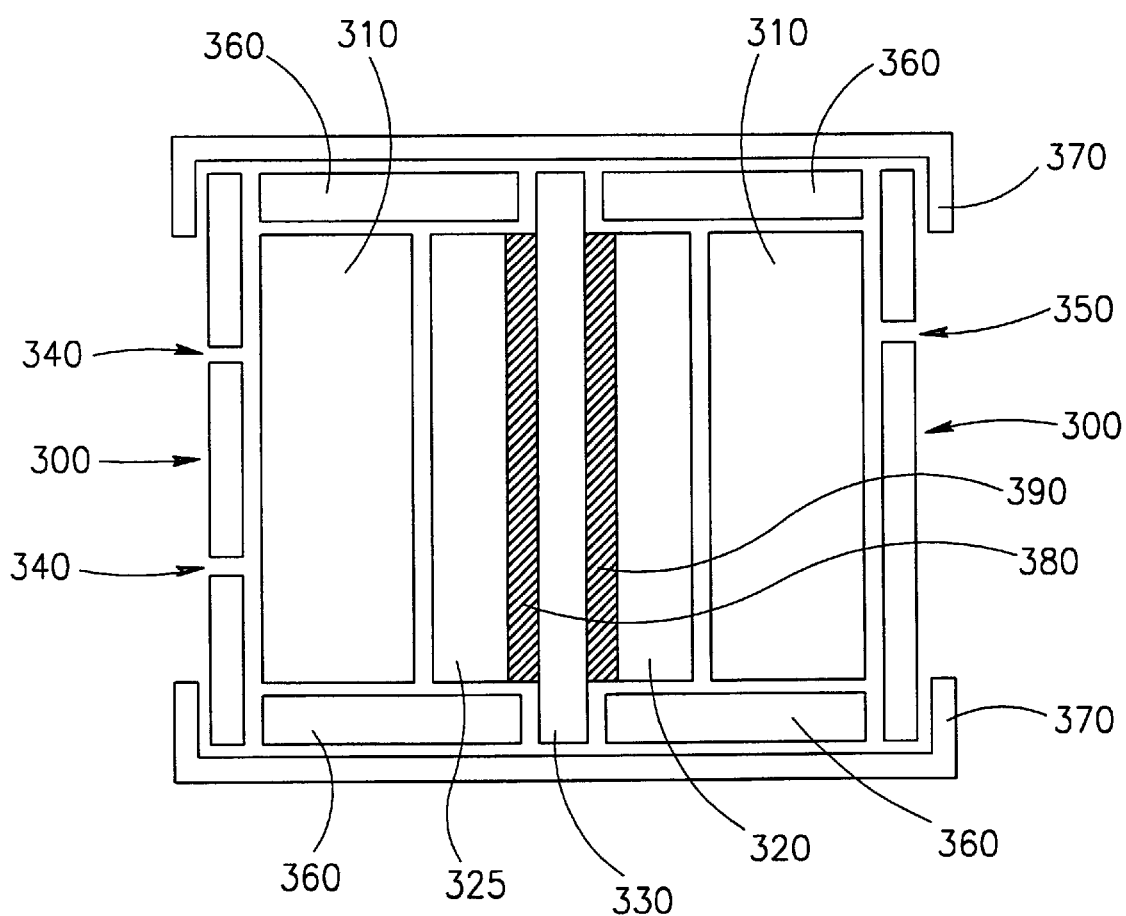
FIG. 12 shows a schematic representation of a fuel cell which operates as a primary battery.

FIG. 12 illustrates schematically this kind of fuel cell, having 0.6 mm thick Hastelloy C-276™ end plates 300, porous non-woven carbon felt (or matrix) RVC 1000™ (Carbone Lorraine) 310 which on one side serve as an air flow field and on the second side as storage cell for the fuel solution; Toray™ paper 320 and a Teflonated Toray™ paper 325 as backing layers, a PCM 330, air inlet ports 340, a fuel solution filling port 350, Teflon™ sealing rings 360, plastic envelopes made of shrinkable tube 370 for holding and sealing the whole assembly. On the cathode side of the PCM, 5 mg nanosize Pt catalyst (purchased from Johnson Matthey) was spread following the procedure described in Example 3, on the teflonated Toray paper 325 to form a catalyst layer 380 while on the anode side, 5 mg of nanosize Pt-Ru 1:1 (atomic ratio) catalyst (Johnson Matthey) was spread following the procedure described in Example 3, on Toray™ paper 320 to form a catalyst layer 390. Both Toray papers (after applying the catalysts) were hot pressed to the PCM at 100° C. and under a pressure of 40 kg./cm2 for 200 sec. After cell assembly, a solution containing 1 M $H_2SO_4$ and 0.5M methanol was inserted through the fuel filling port 350 (closed by adhesive tape), and the cell was discharged. The open circuit voltage of the cell was 0.5V. and it delivered 1 mA/cm$^2$ for a few minutes.

EXAMPLE 6

A fuel cell as described in Example 1 was fabricated. The anode was formed from platinum-ruthenium ink (prepared according to U.S. Pat. No. 5,773,162) that was spread on a carbon fiber sheet commercially available from Toray™ paper. The cathode used was a commercially available E-Tek, Inc Pt black 251 Nafion. As an electrolyte we used Nafion 117, available from DuPont as described in U.S. Pat. No. 5,773,162.

During operation, an aqueous solution of a fuel selected from oxalic acid, dimethyloxalat, ethylene glycol, glycerol, in the concentration range of 0.1–0.5 M was circulated past the anode (with the use of a peristaltic Masterflex L/S Cole-Parmer Instrument Co. pump) at different flow rates from 4 to 15 ml/min.

Oxygen was fed into the cathode compartment directly or through a water bubbler at an ambient pressure and at a rate of 7 to 40 ml/min. The cells were run at 60° C. The polarization curves were found to be similar to those in FIG. 8.

EXAMPLE 7
Solid Feed Organic Fuel Cell

Figure 13:
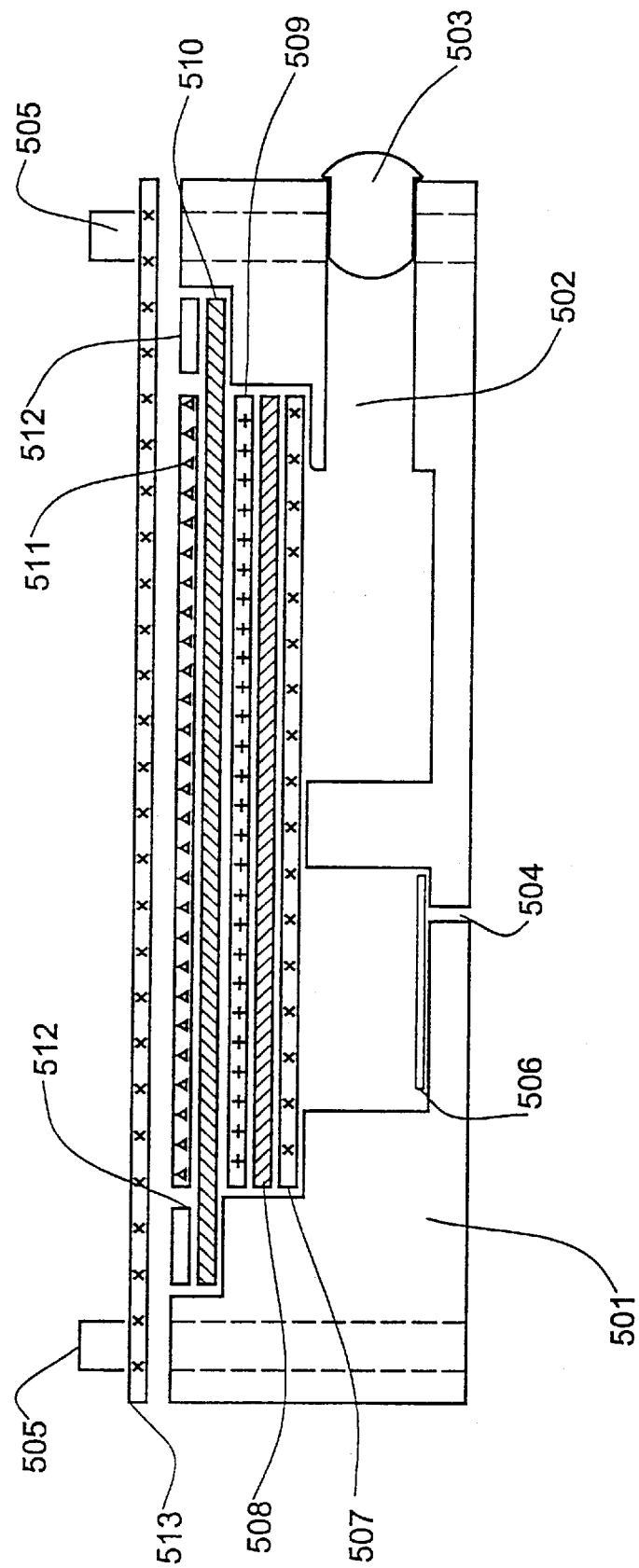
FIG. 13 provides a schematic representation of an improved solid feed organic fuel cell having a solid polymeric membrane configured in accordance with a preferred embodiment of the invention.

FIG. 13 illustrates a solid feed organic fuel cell having a plastic case 501, an anode 509, a cathode 511 and a solid polymer electrolyte membrane 510. The solid organic fuel is filled trough the fuel hole 502 and sealed with a cork 503. The fuel is dissolved in the tank and is absorbed trough a hast alloy net 507 at a porous carbon cloth 508. Carbon dioxide formed in the anode compartment is vented through an exhaust nozzle 504. Since liquid fuel may leek through the exhaust nozzle, the nozzle is covered with a thin hydrophobic porous layer 506. The hydrophobic layer is permeable to the gas only while the fuel solution remains in the tank. The cathode is open to air trough a second hast alloy net 513. In order to prevent the fuel leaking from the cathode side the MEA is sealed with a gasket 512. The second hast alloy net 513 is used also as a cover to the whole assembly.

What is claimed is:

1. A liquid feed direct oxidation fuel cell having an anode, a cathode, a proton conducting membrane disposed between said anode and said cathode, means for supplying an organic fuel, mixture of fuels or organic fuel aqueous solution to the anode and means for supplying oxygen to the cathode, wherein said organic fuel is selected from a group consisting of oxalic acid, dimethyloxalat, glycerol and ethylene glycol and their oxalic and formic esters, glyoxylic acid and its methyl ester, and glyoxylic aldehyde.

2. A hybrid power source comprising a liquid feed fuel cell according to claim 1, a DC to DC converter and a rechargeable battery.

3. A hybrid power source comprising:
   a) a fuel cell which comprises a housing, a solid electrolyte membrane having a first and second surface, disposed in said housing to partition it into an anode side and a cathode side, an anode and a cathode each comprising a catalyst layer and a carbon backing layer and being formed on said first and second membrane surfaces respectively, so as to connect said first surface to the anode side and said second surface to the cathode side, said anode side comprising means for storing an oxidizable fuel or for circulating it past the anode and said cathode side comprising means for flowing oxygen or air past the cathode, wherein said solid electrolyte membrane is a proton conducting membrane having pores with a diameter size which is essentially smaller than 30 nm and comprising:
      (i) 5% to 60% by volume of an electrically nonconductive inorganic powder having a good acid absorption capacity, said powder comprising essentially nanosize particles;
      (ii) 5% to 50% by volume of a polymeric binder that is chemically compatible with acid, oxygen and said fuel; and
      (iii) 10% to 90% by volume of an acid or aqueous acid solution;
   b) a DC to DC converter; and
   c) a rechargeable battery.

4. A hybrid power source according to claim 2, wherein the number of cells in said fuel cell is two or three and said rechargeable battery is a lithium ion battery.

5. A fuel cell according to claim 1 where the $CO_2$ produced during the operation thereof is released through a thin hydrophobic porous matrix placed in the anode compartment or in the fuel tank.

6. A fuel cell which comprises a housing, a solid electrolyte membrane having a first and second surface, disposed in said housing to partition it into an anode side and a cathode side, an anode and a cathode each comprising a catalyst layer and a carbon backing layer and being formed on said first and second membrane surfaces respectively, so as to connect said first surface to the anode side and said second surface to the cathode side, said arnode side comprising means for storing an oxidizable fuel or for circulating it past the anode and said cathode side comprising means for flowing oxygen or air past the cathode, wherein said solid electrolyte membrane is a proton conducting membrane having pores with a diameter size which is essentially smaller than 30 nm and comprising:
  (i) 5% to 60% by volume of an electrically nonconductive inorganic powder having a good acid absorption capacity, said powder comprising essentially nanosize particles;
  (ii) 5% to 50% by volume of a polymeric binder that is chemically compatible with acid, oxygen and said fuel; and
  (iii) 10% to 90% by volume of an acid or aqueous acid solution;
where the $CO_2$ produced during the operation thereof is released through a thin hydrophobic porous matrix placed in the anode compartment or in the fuel tank.

7. A device for controlling the water return flow from the cathode side to the anode side through a membrane in a fuel cell, comprising a water or fuel solution level sensor and air or oxygen pressure control unit which controls the air or oxygen gas pressure in the cathode chamber to increase as the level of water or fuel solution decreases.

8. A fuel cell according to claim 1, utilizing a device for controlling the water return flow from the cathode side to the anode side through a membrane in a fuel cell, comprising a water or fuel solution level sensor and air or oxygen pressure control unit which controls the air or oxygen gas pressure in the cathode chamber to increase as the level of water or fuel solution decreases.

9. A fuel cell which comprises a housing, a solid electrolyte membrane having a first and second surface, disposed in said housing to partition it into an anode side and a cathode side, an anode and a cathode each comprising a catalyst layer and a carbon backing layer and being formed on said first and second membrane surfaces respectively, so as to connect said first surface to the anode side and said second surface to the cathode side, said anode side comprising means for storing an oxidizable fuel or for circulating it past the anode and said cathode side comprising means for flowing oxygen or air past the cathode, wherein said solid electrolyte membrane is a proton conducting membrane having pores with a diameter size which is essentially smaller than 30 nm and comprising:
  (i) 5% to 60% by volume of an electrically nonconductive inorganic powder having a good acid absorption capacity, said powder comprising essentially nanosize particles;
  (ii) 5% to 50% by volume of a polymeric binder that is chemically compatible with acid, oxygen and said fuel; and
  (iii) 10% to 90% by volume of an acid or aqueous acid solution;
utilizing a device for controlling the water return flow from the cathode side to the anode side in a fuel cell, comprising a water or fuel solution level sensor and air or oxygen pressure control unit placed in the cathode compartment.

10. A hybrid power source according to claim 3, wherein the number of cells in said fuel cell is two or three and said rechargeable battery is a lithium ion battery.

11. A fuel selected from the group consisting of oxalic acid, dimethyloxalat, glycerol and ethylene glycol and their oxalic and formic esters, glyoxylic acid and its methyl ester and glyoxylic aldehyde, for use in a direct oxidation fuel cell.

* * * * *

UNITED STATES PATENT AND TRADEMARK OFFICE
CERTIFICATE OF CORRECTION

PATENT NO.    : 6,492,047 B1
DATED         : December 10, 2000
INVENTOR(S)   : Peled et al.

It is certified that error appears in the above-identified patent and that said Letters Patent is hereby corrected as shown below:

Column 15,
Line 12, after "said" and before "side comprising", please replace "arnode" with -- anode --.

Signed and Sealed this

First Day of April, 2003

JAMES E. ROGAN
*Director of the United States Patent and Trademark Office*